United States Patent [19]
Ishida et al.

[11] Patent Number: 5,572,701
[45] Date of Patent: Nov. 5, 1996

[54] BUS SNOOP METHOD AND APPARATUS FOR COMPUTER SYSTEM HAVING CPU WITH CACHE AND MAIN MEMORY UNIT

[75] Inventors: Kazuhisa Ishida; Takashi Inagawa; Katuya Banno, all of Owariasahi, Japan

[73] Assignees: Hitachi, Ltd., Tokyo; Hitachi Chubu Software, Ltd., Aichi-ken, all of Japan

[21] Appl. No.: 229,755

[22] Filed: Apr. 19, 1994

[30] Foreign Application Priority Data

Apr. 23, 1993 [JP] Japan ..................... 5-097378

[51] Int. Cl.⁶ .................................................. G06F 13/14
[52] U.S. Cl. .................... 395/473; 395/287; 364/242.92; 364/243.4; 364/245.5; 364/DIG. 1
[58] Field of Search ..................................... 395/800, 840, 395/403, 440, 445, 468, 473, 860, 859, 872, 287; 340/825.5, 825.51

[56] References Cited

U.S. PATENT DOCUMENTS

| | | | |
|---|---|---|---|
| 5,119,485 | 6/1992 | Ledbetter, Jr. et al. | 395/425 |
| 5,325,503 | 6/1994 | Stevens et al. | 395/425 |
| 5,341,487 | 8/1994 | Derwin et al. | 395/425 |
| 5,355,467 | 10/1994 | MacWilliams et al. | 395/425 |
| 5,426,765 | 6/1995 | Stevens et al. | 395/425 |

FOREIGN PATENT DOCUMENTS 4101251  4/1992  Japan .

*Primary Examiner*—Alpesh M. Shah
*Attorney, Agent, or Firm*—Antonelli, Terry, Stout & Kraus

[57] ABSTRACT

Bus snoop method and apparatus for use in a computer system in which a CPU with cache is coupled to a main memory control unit for controlling a main memory unit through a bus snoop control unit, wherein when the CPU with cache occupies a bus at the time that an external bus master transfers data to the main memory unit, a transfer address for transfer of the data undergoes buffering in the bus snoop control unit and after the CPU with cache ends the execution of an instruction and opens a bus right, the bus snoop control unit transfers the data transfer address subject to buffering to the CPU with cache and a corresponding address recorded in the cache is canceled.

6 Claims, 4 Drawing Sheets

BUS SNOOP METHOD AND APPARATUS FOR COMPUTER SYSTEM HAVING CPU WITH CACHE AND MAIN MEMORY UNIT

BACKGROUND OF THE INVENTION

The present invention relates to bus snoop method and apparatus and more particularly to bus snoop method and apparatus which can lessen the influence of a low speed bus and give full play to the high-speed capability of a high speed bus in a computer system in which the low speed bus is coupled to the lower hierarchy of the high speed bus.

Generally, a CPU, a main memory unit, an external bus master and an I/O device are coupled to each other through a high speed bus and the I/O device is coupled to external peripheral units through a low speed bus. In this case, when the CPU accesses the I/O device to make a request to it for any data, the I/O device operates at a low speed and therefore the CPU must remain in a standby state until it receives data from the I/O device through the high speed bus and the high speed bus is occupied by the CPU during this standby condition. Accordingly, when the external bus master, for example, tries to access the main memory unit for the sake of transferring data, the accessing is not permitted during the occupation of the high speed bus by the CPU.

Especially, in a case where the CPU is a CPU with a cache and the bus master is provided with a direct memory access (hereinafter referred to as DMA) controller, an address and data recorded in the cache memory must always be coincident with the contents stored in the main memory unit. Therefore, in the past, when the DMA controller rewrites data at an address in the main memory unit, a snoop the procedure for snoop is taken each time a rewrite operation is carried out to check that the data at the address is transferred to the cache memory and if the transfer is completed, the address and the corresponding data are canceled. This control processing will hereinafter be called a snoop processing.

However, during the occupation of the high speed bus by the CPU, the snoop processing to be effected each time data of the main memory unit is rewritten cannot be executed. Consequently, a rewrite of data into the main memory unit due to access by the DMA controller remains in a standby state until the occupation of the high speed bus by the CPU is released, and after the occupation by the CPU is released, the data rewrite operation is executed and at the same time the snoop processing is executed, thus failing to make full use of the high-speed performance inherent to the high speed bus.

In order to avoid the above disadvantage of the cache memory snoop scheme, an example of an improved cache memory snoop scheme as described in JP-A-4-101251 has been proposed. According to this proposal, each time that access other than a rewite access to the main memory unit takes place, for example, a reading of data from the main memory unit or access to another memory unit than the main memory unit, which does not involved a snoop operation to the cache memory, data transfer is executed through a high speed bus without carrying out the snoop processing; however for data transfer needed for a data rewrite to the main memory unit which requires the snoop processing, a release of the occupation of the high speed bus by the CPU is waited for and after the release is completed, the snoop processing is executed.

In the conventional cache memory snoop scheme, a snoop generation circuit always monitors the state of the system bus and when an instruction for a data write operation is issued from the external bus master or DMA controller, it is detected whether an address for writing of the data is included in an address area targeted for the cache memory and only when the accessed address is included in the cache target area, a snoop signal is rendered to be active to execute the snoop processing to the cache memory. According to this scheme, however, when an instruction for writing data into the cache target area occurs, execution of the instruction is effected after the occupation of the high speed bus by the CPU is released, with the result that not only the high-speed capability of the high speed bus cannot be utilized sufficiently, but also data supplied externally during standby of the CPU is accumulated in the I/O device and the I/O device is sometimes caused to overrun; and besides, when data transfer due to DMA is executed through a period other than the period for the occupation of the high speed bus by the CPU, interference sometimes occurs between the I/O device and the CPU with cache, thus raising a problem that the throughput of the I/O device is degraded.

SUMMARY OF THE INVENTION

An object of the present invention is to provide a bus snoop method and apparatus which can permit the DMA controller to access the main memory unit without waiting for the completion of execution of an instruction by the CPU with cache and can give full play to the high-speed capability of the high-speed bus without suffering the influence of the low speed bus.

According to the bus snoop method and apparatus of the present invention, when a CPU with cache occupies a system bus at the time that the CPU is coupled to a main memory unit through a bus snoop control unit and an external bus master writes data to the main memory unit, an address, at which the external bus master transfers data to the main memory unit, undergoes buffering in the bus snoop control unit and after the CPU ends the execution of an instruction and releases the occupation of the system bus, the bus snoop control unit transfers the data transfer address subject to buffering to the CPU to cause it to perform a snoop processing of the cache memory and to execute, when a corresponding address is present in the cache, the operation of canceling the address.

DESCRIPTION OF THE PREFERRED EMBODIMENTS

An embodiment of the present invention will be described hereunder in greater detail with reference to the accompanying drawings.

Figure 1:
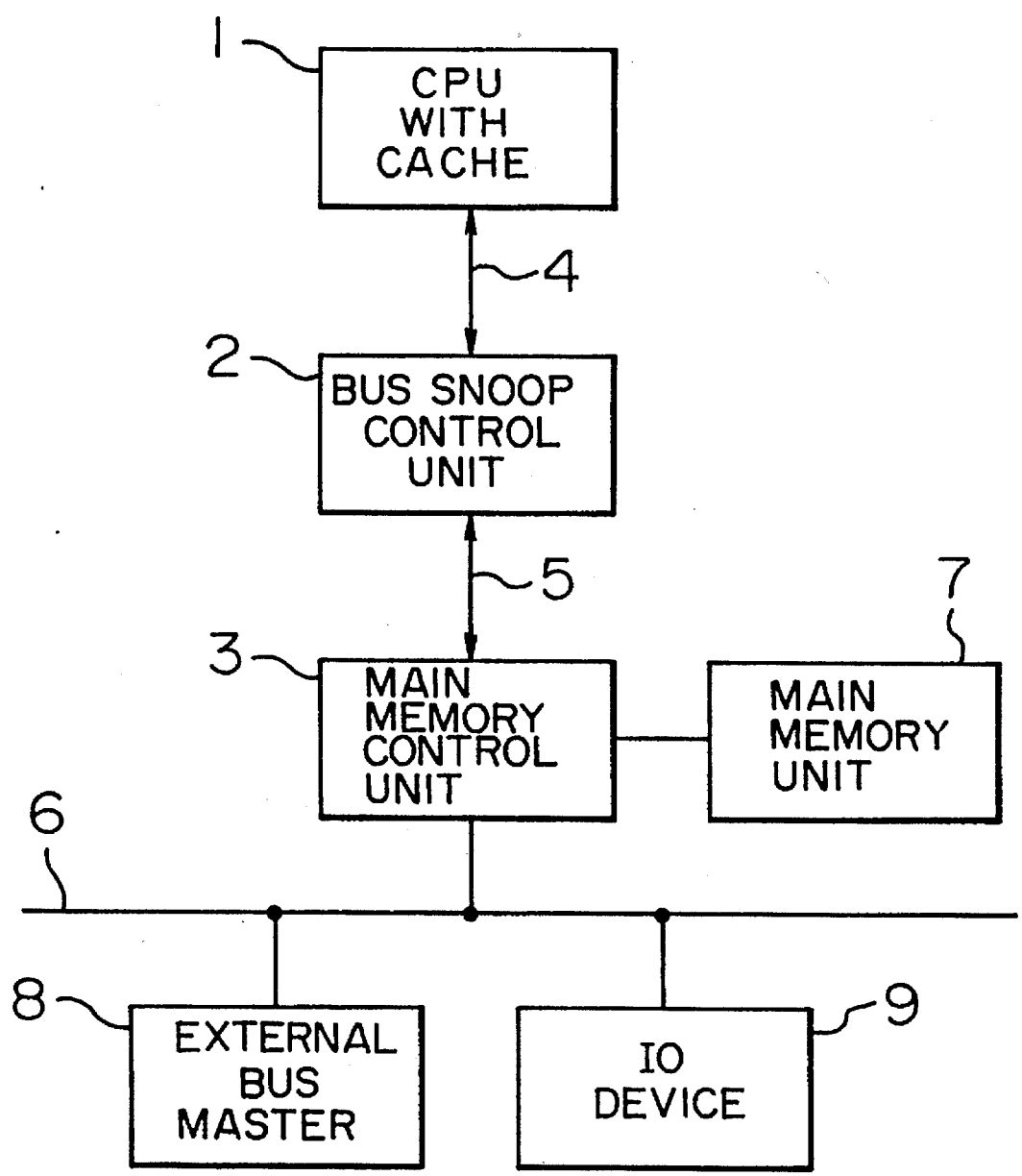
FIG. 1 is a block diagram showing an embodiment of a computer system to which a bus snoop method according to the present invention is applied.

Referring to FIG. 1, in a CPU with cache 1, a cache memory is coupled to a processor bus 4 through the CPU. The CPU with cache 1 is coupled to a bus snoop control unit 2 through the processor bus 4 and is then coupled to a main memory control unit 3 through a host bus 5. The main memory control unit 3 controls write/read of data to and from a main memory unit 7. The main memory control unit 3 is coupled to an external bus master 8 and an I/O device 9 through a system bus 6. Generally, the external bus master 8 includes a DMA controller. While the processor bus 4, host bus 5 and system bus 6 are in general called a high speed bus, the I/O device 9 includes a low speed bus through which the computer system shown in FIG.1 is coupled to peripheral units.

When the CPU with cache 1 reads data from the I/O device 9, the time taken for the CPU 1 to receive data transferred from the I/O device after the CPU 1 has accessed the I/O device 9 is very long. Accordingly, while the CPU 1 remains in a standby state until it receives data after accessing the I/O device 9, the processor bus 4 is occupied by the CPU 1. When, during this period, the external bus master 8 writes data to the main memory unit 7 through the system bus 6 under the direction of DMA control, the main memory control unit 3 executes a writing of data to the main memory unit 7 and at the same time delivers a signal SNPRQ to the bus snoop control unit 2. This SNPRQ signal is a signal for requesting a snoop processing in order that, as writing of data into the main memory unit 7 occurs, the contents of the cache memory also can be rewritten so as to be identical to the contents of the main memory unit. In parallel with this SNPRQ signal, an address at which the data is written into the main memory unit (hereinafter referred to as a DMA address) is also sent to the bus snoop control unit 2.

When receiving the SNPRQ signal from the main memory control unit 3, the bus snoop control unit 2 immediately executes the bus snoop processing unless the processor bus 4 is occupied by the CPU 1, but holds the DMA address in a buffer included in the bus snoop control unit if the processor bus is occupied by the CPU. If the SNPRQ signal is received plural times during a period in which the processor bus 4 is occupied by the CPU, the bus snoop control unit 2 carries out sequential buffering of individual DMA addresses each time that the respective SNPRQ signals arrive. Then, when the occupation of the processor bus 4 by the CPU 1 is released and the bus snoop control unit 2 acquires a bus right, the bus snoop control unit 2 allows the CPU 1 to execute the snoop processing and to cancel an address corresponding to the DMA address if the corresponding address is contained in the cache memory.

It is to be noted that data in the cache memory can be processed in a unit of management of data. In this case, the DMA address is converted by the bus snoop control unit 2 into a snoop address representative of a head address in a management unit and delivered to the processor bus 4. Cancellation of addresses in the cache memory is carried out in a management unit.

Figure 2:
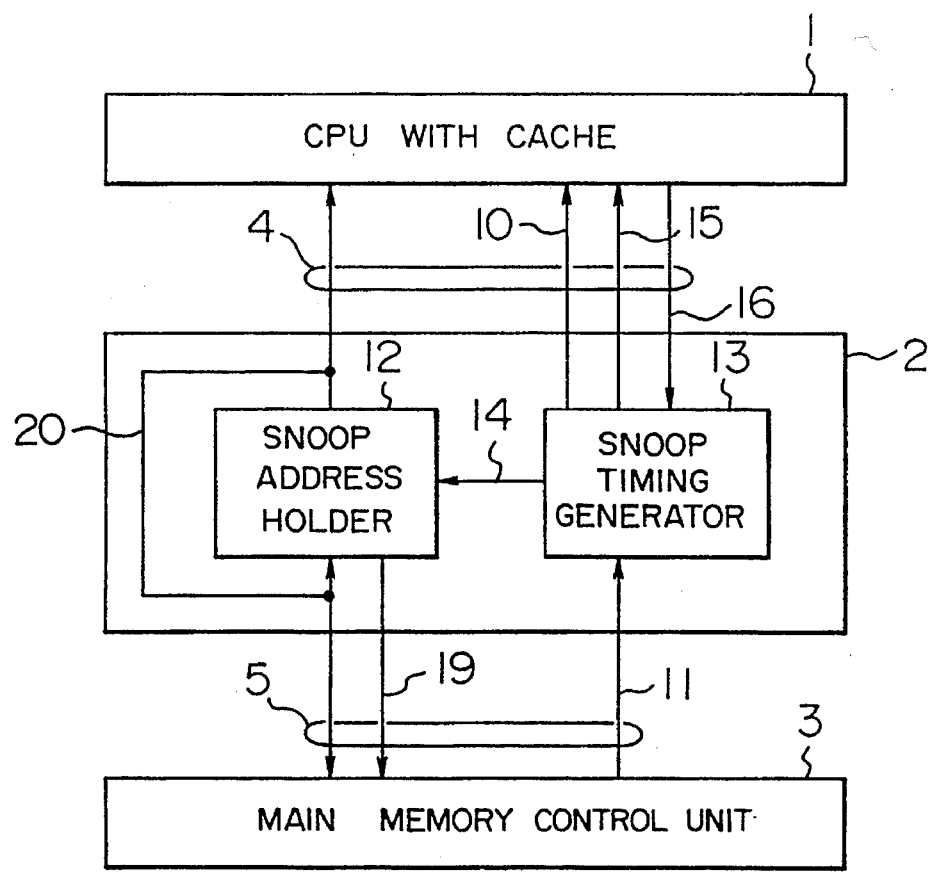
FIG. 2 is a block diagram including a detailed diagram of the interior of a bus snoop control unit in FIG. 1.

FIG. 2 is a block diagram including the internal structure of the bus snoop control unit 2 of FIG. 1.

Referring to FIG. 2, the bus snoop control unit 2 includes a snoop address holder 12 which plays the role of a buffer for holding DMA addresses transferred from the main memory control unit 3 and a snoop timing signal generator 13 for generating a snoop timing signal which starts the holder 12.

The main memory control unit 3 always monitors addresses on the system bus 6 and when an access for writing of data into an address area of the main memory unit 7 is effected, it transfers an SNPRQ signal to the snoop timing generator 13 through a line 11 of the host bus 5. When receiving the SNPRQ signal, the snoop timing generator 13 sends a snoop access latch commanding signal to the snoop address holder 12 via line 14 to cause it to hold a DMA address delivered out of the main memory control unit 3.

Also, the snoop timing generator 13 keeps delivering a bus right request signal to the CPU 1 through a line 15. If the CPU 1 releases the occupation of the processor bus 4 while the bus right request signal remains active, the CPU 1 sends a bus right acknowledging signal to the snoop timing generator 13 through a line 16. At that time, the snoop timing generator 13 delivers a snoop signal to the CPU 1 through a line 10 in order to cause the CPU 1 to execute a snoop processing. As a result, the CPU 1 reads a snoop address from the snoop address holder and retrieves a corresponding address in the cache memory. If no corresponding address is found as a result of the retrieval, then no processing will be carried out but when the corresponding address is found, the corresponding address in the cache memory is canceled.

When the snoop address holder 12 is filled up with address data, a DMA stop signal for informing the main memory control unit 3 that SNPRQ signals cannot be received any more is delivered to the main memory control unit 3 through a line 19. This causes the external bus master 8 to stop performing accessing for writing of data into the main memory unit 7. In this case, the snoop processing is executed and thereafter the DMA stop is released and operations similar to the above are resumed.

Figure 3:
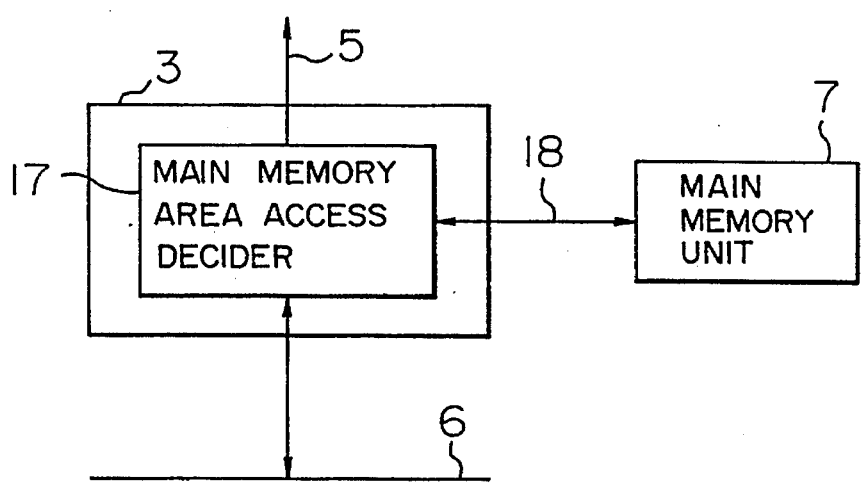
FIG. 3 is a block diagram including a detailed diagram of a main memory unit in FIG. 1.

FIG.3 is a block diagram for explaining the operation of the main memory control unit 3 in FIG. 1.

Referring to FIG.3, the main memory control unit 3 has a main memory area access decider 17. The main memory area access decider always monitors addresses on the system bus 6 and as soon as the external bus master 8 or I/O device 9 accesses the main memory unit 7, it writes data into the main memory unit 7 through a line 18 and at the same time transfers an SNPRQ signal and a DMA address to the bus snoop control unit 2 through the host bus 5.

Figure 4:
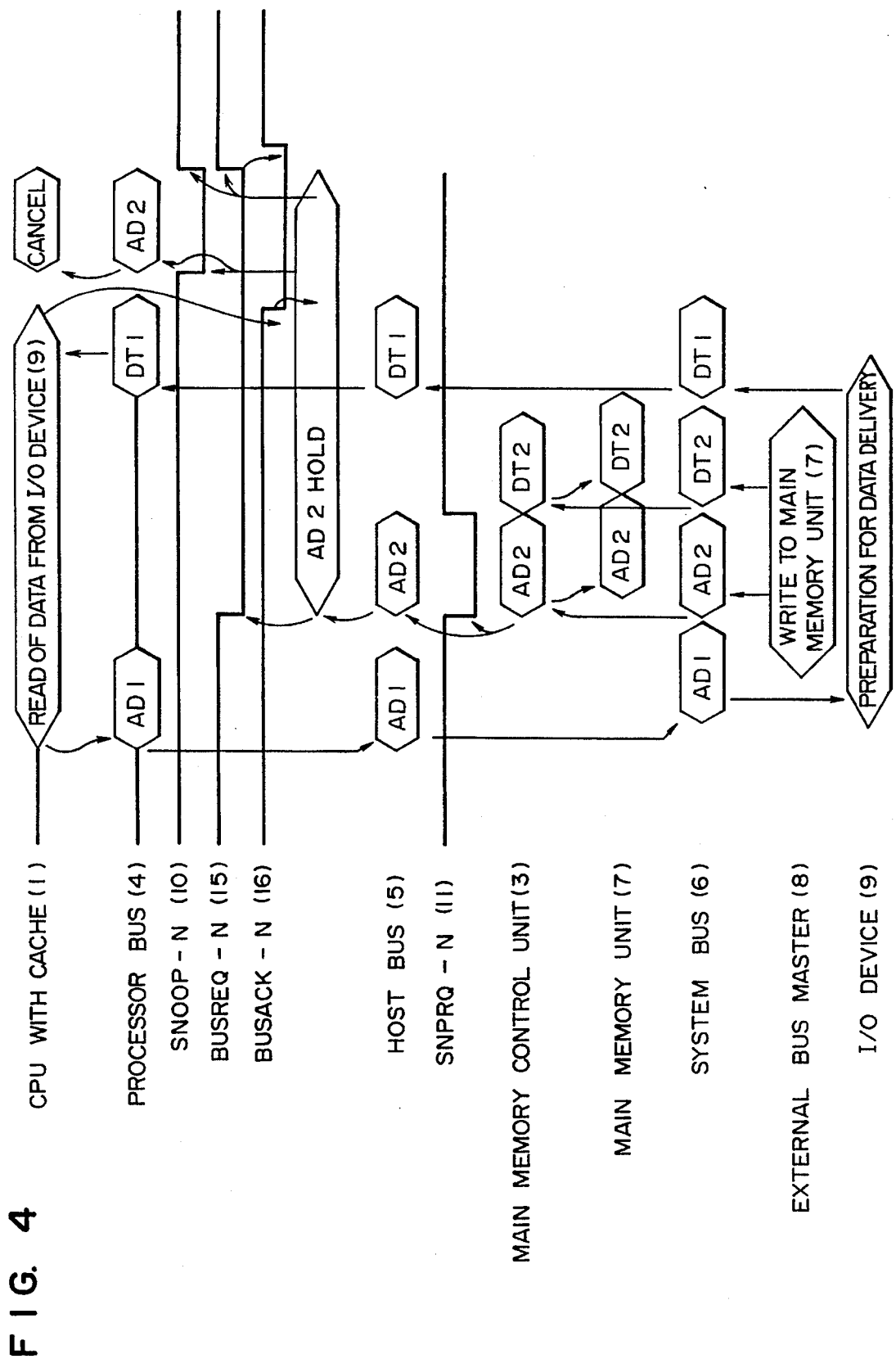
FIG. 4 is a diagram showing operation timings in the bus snoop method according to the present invention.

In the embodiment of the present invention described above, the CPU with cache serves as a master to carry out operation. FIG. 4 is a time chart showing the operation of the present invention in this case. Control operation of the bus snoop control unit 2 effected when the external bus master 8 performs DMA access to the main memory unit 7 while the CPU 4 occupies the processor bus 4 will be described hereunder with reference to FIG.4. For simplification of explanation, the following description will be given on the assumption that the snoop processing is not carried out in management unit but is executed for every address.

When the CPU with cache 1 delivers an address AD1 to the processor bus 4 to read data from the I/O device 9, the CPU 1 remains in a standby state until it receives data DT1 from the I/O device.

The bus snoop control unit 2 relays the address AD1 delivered out of the CPU 1 from the processor bus 4 to the host bus 5 through the line 20 and then the main memory control unit 3 passes the address AD1 to deliver it to the system bus 6. After receiving the address AD1 from the system bus 6, the I/O device 9 prepares the data DT1 and delivers it, but the time taken for the I/O device 9 to prepare the data DT1 is long because the I/O device 9 includes a low speed bus.

When the I/O device 9 delivers the data DT1, the main memory control unit 3 transfers the data DT1 from the system bus 6 to the host bus 5 and then the bus snoop control unit 2 passes the data DT1 to deliver it to the processor bus 4. Consequently, the CPU 1 receives the data DT1 and ends the data read operation.

On the other hand, when the external bus master 8 delivers data DT2 onto the system bus 6 in order to write the data DT2 to an address AD2 of the main memory unit 7 while the I/O device 9 prepares the data DT1, the main memory control unit 3 receives the address AD2 and data DT2 and transfers them to the main memory unit 7 to perform data recording and at the same time delivers an SNPQR signal and the address AD2 to the host bus 5.

Then, the bus snoop control unit 2 holds the address AD2 at the snoop address holder 12 and at the same time delivers a bus right request signal BUSREQ-N onto the line 15, keeping the line active. When the CPU 1 ends the reading of data from the I/O device 9 after receiving the signal BUSREQ-N, it delivers a bus right acknowledging signal BUSACK-N to render the line 16 active.

When detecting the bus right acknowledging signal BUSACK-N, the bus snoop control unit 2 delivers a snoop signal SNOOP-N onto the line 10 and at the same time delivers the address AD2 from the snoop address holder 12 to the processor bus 4. The CPU 1 receives this address AD2 and if a corresponding address is present in the cache memory, it cancels the corresponding address. Through this, the contents of the cache memory can warrantably be prevented from becoming non-coincident with the contents of the main memory unit 7.

Figure 5:
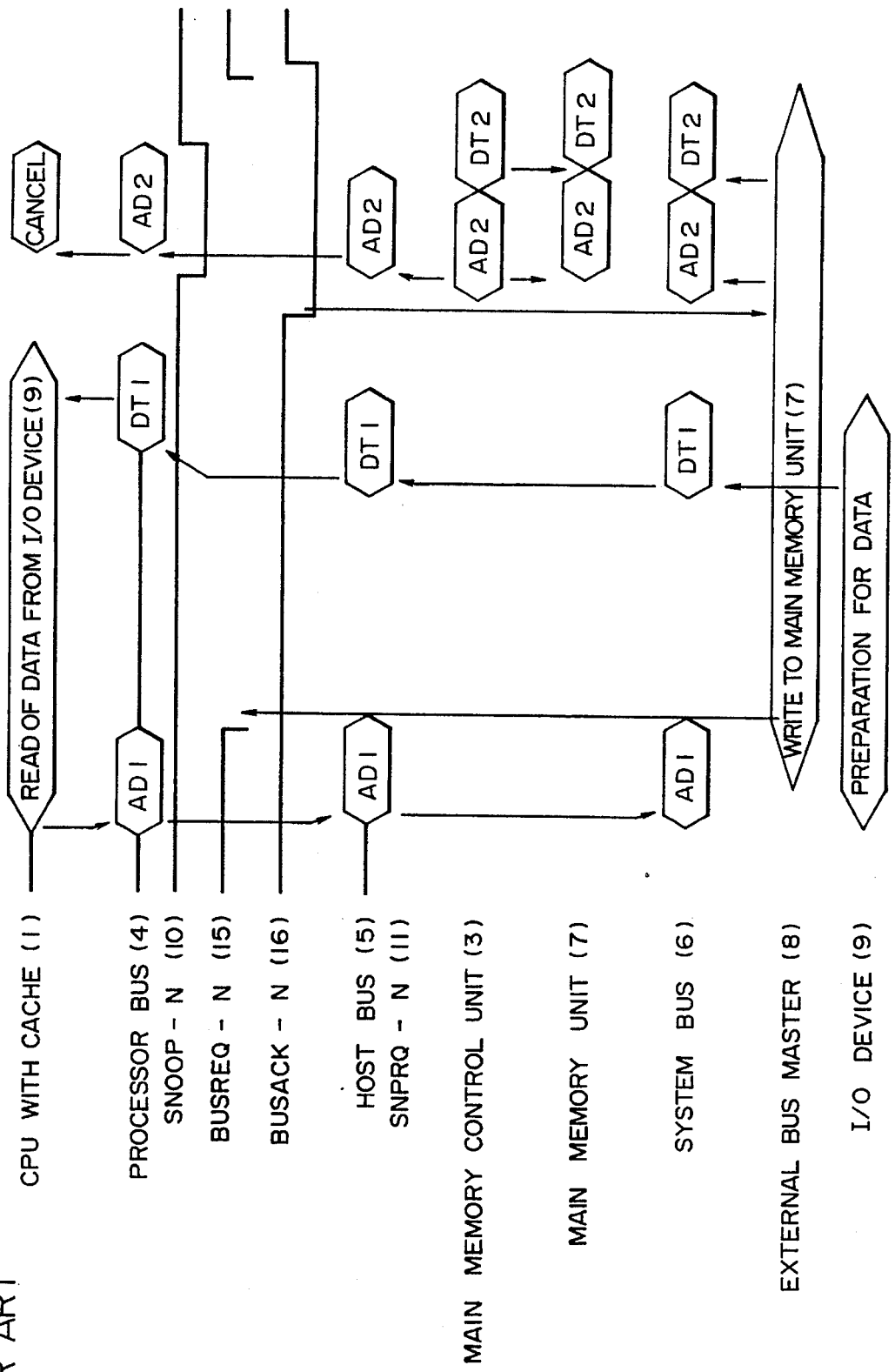
FIG. 5 is a diagram showing operation timings in the conventional bus snoop method useful for comparison with operation timings in the present invention shown in FIG. 4.

FIG.5 shows a timing chart of the snoop operation in the conventional apparatus and is an illustrative diagram useful in making the operation of the present invention clearer by comparing the snoop operation in the present invention with that in the conventional apparatus.

When the external bus master 8 writes the data DT2 to the address AD2 of the main memory unit 7, the address AD2 cannot be held by the bus snoop control unit 2 and consequently the external bus master 8 must wait until the data read operation by the CPU with cache 1 is ended.

More particularly, in order to read data of the I/O device 9, the CPU with cache 1 delivers the address AD1 to the processor bus 4 and remains in a standby state until the data DT1 arrives. Then, when the CPU with cache 1 receives the data DT1 delivered out of the I/O device 9 in a similar manner to the operation of FIG. 4, the data read operation ends.

Since the external bus master 8 delivers the address AD2 and data DT2 to the system bus 6 after the data read operation by the CPU with cache 1 ends and the BUSACK-N 16 becomes active, it takes a longer time to perform writing to the main memory unit 7 in the operation of FIG.5 than in the operation of FIG. 4. In addition, since the system bus 6 is occupied correspondingly for a longer time, as will be clear from FIG. 4, the performance is degraded.

As described above, according to the present invention, DMA access to the main memory unit can be carried out before the execution of an instruction by the CPU with cache ends and therefore the bus snoop operation for cache cancellation can be accomplished without degrading the performance of the bus.

We claim:

1. A computer system comprising:

a main memory unit, a bus master and an I/O device which are coupled to each other through a bus;

a main memory control unit which controls write/read to and from said main memory unit and, in response to an instruction for writing data to said main memory unit being issued, delivers a snoop request signal and an address at which data is to be written and effects the transfer of data to said main memory unit even when said bus is in a standby state;

a CPU which has a cache memory for holding data read out of said main memory unit and means responsive to the writing of data to an address of said main memory unit being carried out by said main memory control unit, for performing a snoop processing for cancelling an address in said cache memory corresponding to said address of said main memory unit where data has been written; and a bus snoop control unit responsive to a snoop request signal and an address delivered out of said memory control unit, for buffering said address, for determining when said bus is in a standby state because said CPU occupies said bus and for causing said CPU to execute snoop processing using said buffered address when said bus is released from a standby state because it is no longer occupied by said CPU.

2. A computer system according to claim 1, wherein said main memory control unit includes means for delivering to said bus snoop control unit a plurality of snoop request signals, each accompanied by a memory address of a unit of data being transferred to said main memory unit, when said bus is in a standby state because said bus is occupied by said CPU.

3. A computer system according to claim 2, wherein said bus snoop control unit includes:

a snoop address holder for effecting buffering of plural addresses received from said main memory control unit; and a snoop timing generator, responsive to receipt of each snoop request signal from said main memory control unit, for delivering a signal for requesting a bus right to said CPU and for causing said snoop address holder to latch said addresses accompanying the snoop request signals.

4. A computer system according to claim 3 wherein said snoop timing generator has means which, when said CPU issues a bus acknowledging signal in response to said bus right request signal, responds to said bus right acknowledging signal to deliver a snoop signal to said CPU to cause it to execute the snoop processing.

5. A computer system according to claim 3 wherein said snoop address holder has means which, when said holder is filled up with addresses, stops write of data to said main memory unit by said bus master.

6. A bus snoop method comprising the steps of:

causing a CPU with cache memory to make a request via a bus to an I/O device for first data and placing said bus in a standby state until said first data is provided by said I/Q device;

causing a bus master to make a request to a main memory unit for writing second data in said main memory unit even while said bus is in a standby state;

causing a main memory control unit for controlling said main memory unit to write said second data to said main memory unit and to deliver an address of said main memory unit at which said second data is to be written and a snoop request signal to a bus snoop control unit;

causing said bus snoop control unit to deliver, when it receives the snoop request signal, a bus right request signal to said CPU and to effect buffering of said address of said main memory unit at which said second data is written when said bus is in a standby state;

causing said CPU to release said bus from a standby state, when it receives said first data from said I/O device after receiving said bus right request signal, and for delivering a bus acknowledging signal to said bus snoop control unit;

causing said bus snoop control unit to deliver, when it receives said bus acknowledging signal, a snoop signal to said CPU; and causing said CPU to read, when it receives said snoop signal, an address buffered in said bus snoop control unit and to cancel a corresponding address recorded in said cache memory.

* * * * *